Nov. 24, 1959  M. E. ROSS  2,914,364
SEALED WHEEL
Filed May 28, 1956  2 Sheets-Sheet 1
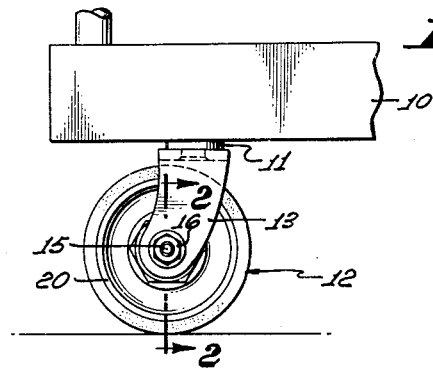
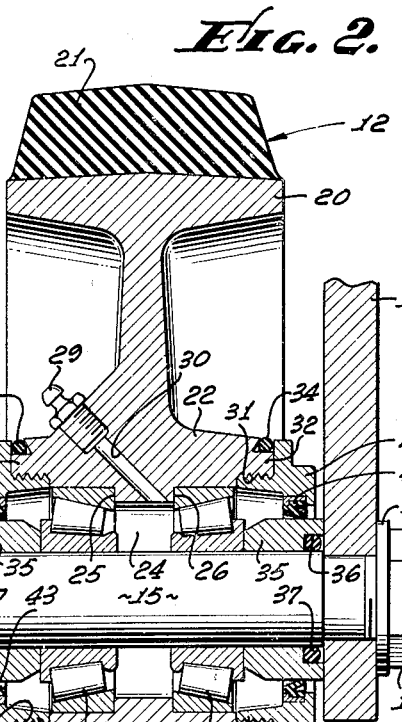
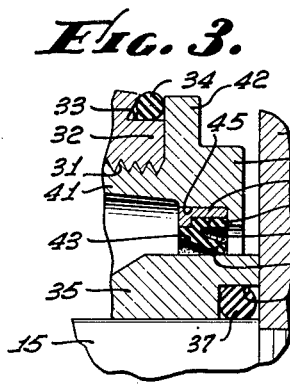
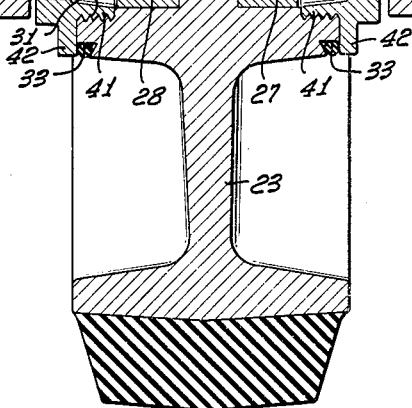
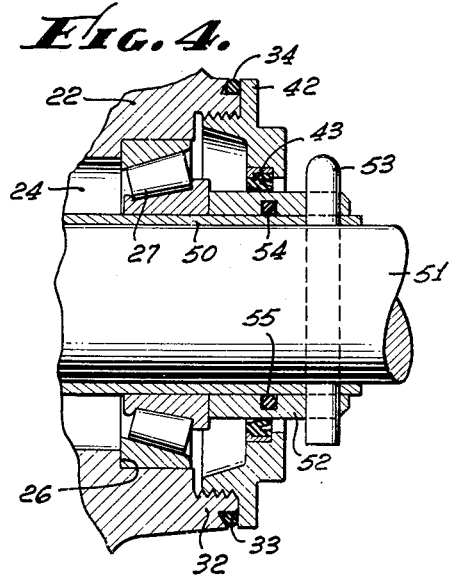
MILTON E. ROSS
INVENTOR.
Huebner, Beehler, Worrel & Herzig.
BY
Vernon D. Beehler
ATTORNEYS.

Nov. 24, 1959 M. E. ROSS 2,914,364
SEALED WHEEL
Filed May 28, 1956 2 Sheets-Sheet 2

MILTON E. ROSS
INVENTOR.
Huebner, Beehler, Worrel & Herzig.
BY
Vernon D. Beehler
ATTORNEYS.

United States Patent Office 2,914,364
Patented Nov. 24, 1959

2,914,364
SEALED WHEEL

Milton E. Ross, Burbank, Calif., assignor to Aerol Co., Inc., Los Angeles, Calif., a corporation of California Application May 28, 1956, Serial No. 587,629

6 Claims. (Cl. 308—187.1)

The invention relates to sealed wheels and has particular reference to wheels mounted by means of bearings on a stationary axle and used to a large degree for supporting trucks and carts in factories, plants, warehouses, and similar operations, especially under circumstances where the vehicles carried by the wheels must be kept in a clean and sanitary condition.

In the food industry in particular, whether it relate to meats or other food products, recent laws require extremely sanitary conditions. To comply with those laws, trucks and carts used in handling the food products are regularly washed and sterilized. Such washing and sterilizing as a rule takes place at least once each day. The washing and sterilizing processes involve to a great degree use of steam, detergents and at times corrosive chemicals which, if not controlled, are apt to damage metals of the type employed in the manufacture of bearings. Since a tremendous amount of cartage is employed in such industries for the transportation of relatively heavy loads, the truck wheels are mounted on bearings for ease of operation. Unless such bearings are kept entirely free of the corrosive substances, they soon deteriorate and need expensive servicing and replacement.

Although some types of seals for wheels of this kind have already been developed, certain limitations have appeared. For example, the type of wheel usually employed is one wherein the axle or shaft remains stationary and the wheel rotates. One seal among those necessary must in consequence be a rolling seal and in devices heretofore employed the rolling seal has given trouble in that as it wears it loses its effectiveness.

Another troublesome spot lies in the likelihood of corrosive substances to creep along the stationary axle or shaft and thereby gain entrance into the hub cavity. Moreover, where any joint is exposed to the corrosive substances, such as even a tightly threaded joint, there is invariably some penetration of liquid substance into the threads which is of a progressive nature and which ultimately damages the joint.

It is therefore among the objects of the invention to provide a new and improved sealed wheel wherein virtually all junctions of a metal to metal character are sealed near the exterior surface so as to minimize the likelihood of penetration by damaging substances.

Another object of the invention is to provide a new and improved sealed type wheel wherein bearings contained within a hub cavity are isolated from the exterior both with respect to joints remaining stationary once the wheel is assembled and with respect to joints one part of which must rotate with respect to the other when the wheel is in use.

Still further among the objects of the invention is to provide a new and improved sealed wheel construction wherein the type of sealing material and the annular cavity in which it is contained are designed one with respect to the other so as to make most advantageous use of the particular seal involved and the performance required of it.

An object also of the invention is to provide in a new and improved sealed wheel assembly adjusting means by means of which adjustment of roller bearings can be accomplished in small increments previously set so that the mechanic can make a precise adjustment when the wheel is mounted on the axle without it being necessary to in any way disassemble the device and thereby disturb the sealing relationship of either fixed or rotatable seals.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of a sealed wheel of a type adapted to be mounted as a caster wheel.

Figure 2 is a longitudinal sectional view taken on the line 2—2 of Figure 1 showing one form of the sealed wheel construction.

Figure 3 is an enlarged fragmentary view of the portions of the sealed wheel structure which house the seals.

Figure 4 is a fragmentary longitudinal sectional view of a slightly modified form of the sealed wheel of a style frequently identified as an inside mount.

Figure 5:
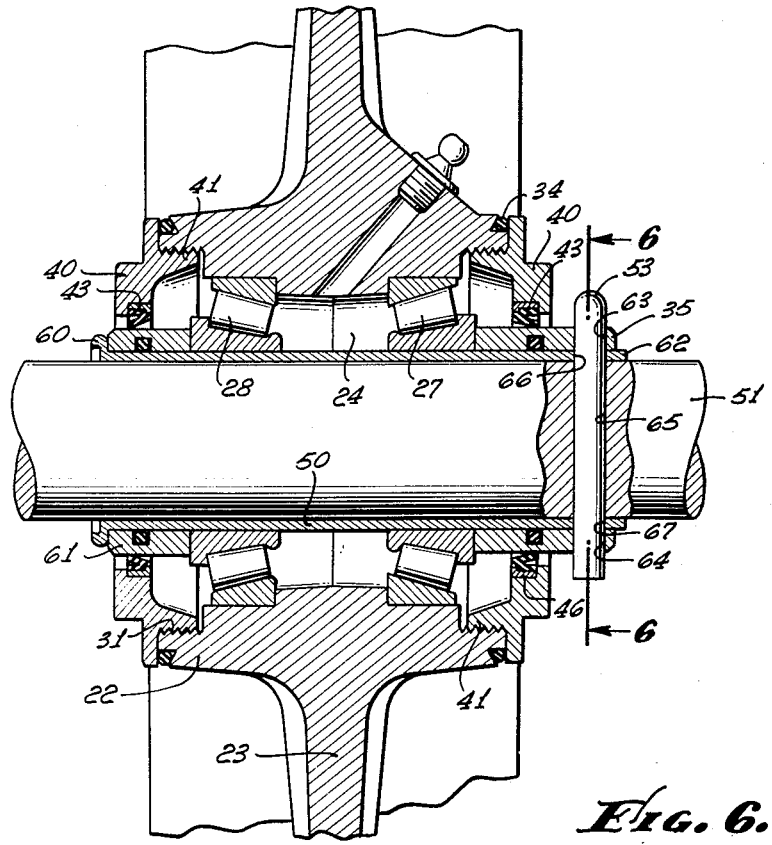
Figure 5 is a longitudinal sectional view of the complete center portion of the form shown in Figure 4.

In an embodiment chosen for the purpose of illustration there is shown a truck body 10 provided with a caster mount 11 for supporting a sealed wheel 12. In this particular embodiment the caster mount includes a fork having legs 13 and 14 extending downwardly through which an axle or shaft 15 extends. In this embodiment nuts 16 and 17 attached to threaded ends 18 and 19, respectively, of the axle anchor the axle in place. Thus anchored, with the assistance of washers 118, the axle is stationary and non-rotatable.

The wheel itself comprises a tire 20 on which is a wearing surface 21. A hub 22 is connected to the rim by means of a spoke flange 23. In the hub is a central hub cavity 24 axially disposed and open at both ends. Shoulders 25 and 26 provide means for properly mounting bearing ring assemblies 27 and 28. A lubricating fitting 29 may be employed to give access through a lubricating bore 30 to the hub cavity.

At each end of the hub cavity is a female thread 31 extending inwardly a short distance from the outermost end. Immediately adjacent the thread is a rim 32 which is identical on each side. Opposite the thread 31 and adjacent the rim 32 is an undercut recess 33. The recess opens obliquely outwardly and endwardly and receives an O ring 34, which ring is slightly larger in diameter than the breadth of the undercut recess.

In the embodiment herein described there is employed a packing sleeve 35 which at its inner end bears against the inside race of the respective bearing ring assembly. Extending around the inside circumference of the packing sleeve and opening outwardly is an annular recess 36. Within the recess 36 on each side is an O ring 37 which substantially fills and seals the space between the sleeve and the exterior surface of the axle 15.

For closing the outside ends of the cavity 24 there is provided on each side a packing ring 40. An exteriorly threaded section 41 is in threaded engagement with the female threads 31 and can be drawn tight so as to seal the joint between the packing ring and the rim 32 by use of the respective O ring 34. A flange 42 of sufficiently large diameter overlies the undercut recess 33, thereby to confine the O ring.

Between the packing ring 40 and the sleeve 35 on each side is a rotating seal. This seal is embodied in a rotating packing gland 43. The packing gland 43 is employed together with an insert 46 in which is an annular pocket 47 in which a leg 48 of the gland is customarily fastened so that these parts are handled as a one piece assembly. The gland is substantially V-shaped in cross section and has another leg 44 which extends obliquely downwardly so that the outermost end of the leg forms a line contact between the packing gland and the exterior surface of the sleeve. This is a rotating contact.

It will be noted that the leg 48 is of such shape that it is confined against movement endwise in both directions and the packing gland assembly once in position cannot be dislodged. Inherent resiliency in the material of the gland provides for maintaining a sealing relationship as the wheel rotates relative to the sleeve 35.

It will be noted that by reason of positioning the O rings and packing gland near the exterior junction of the only three locations where harmful liquids might creep into the interior of the hub cavity, great assurance against deterioration is provided for the working parts. The single rotating seal provides a line contact sliding seal and oriented as shown and described, any tendency for steam or other liquid to exert a pressure against the packing gland 43 will tend to increase the sealing effect, thereby to further assure against ingress of harmful liquids into the hub cavity. The other O rings by reason of their location prevent the harmful liquids from reaching the threads, as in the instance of the O ring 34, whereas the ring 37 prevents the creeping of liquids along the axle.

In the embodiment of the invention illustrated in Figure 4 the general arrangement and design already described in connection with Figures 1, 2 and 3 is followed except for the employment of a relatively thin sleeve 50 which extends throughout that portion of an axle 51 which lies within the hub cavity and the hub. A packing sleeve 52 of slightly different design has a cotter pin 53 extending through it and through the sleeve 50 and axle 51, thereby to pin these portions of the device to the axle. On the interior surface of the packing sleeve 52 is a recess 54 in which is an O ring 55 adapted thereby to seal the exterior surface of the sleeve 50 with respect to the interior surface of the sleeve 52. In other respects the structure of Figure 4 is the same as that previously described.

Figure 6:
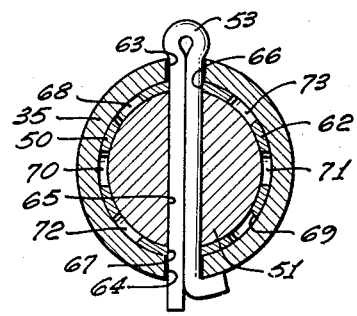
Figure 6 is a cross-sectional view on the line 6—6 of Figure 5.
Figure 7:
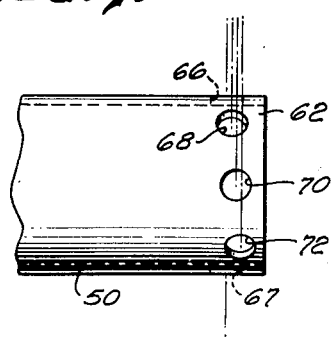
Figure 7 is a side elevational view of the sleeve of the form of invention of Figures 4, 5 and 6.

Of special moment in the embodiment of the invention directed to an inside mount for the wheel illustrated in Figures 4, 5, 6 and 7 is the special construction of the bearing sleeve heretofore identified as the relatively thin sleeve 50. It will be noted that at the left end of the sleeve 50 as viewed in Figure 5 there is provided an annular flange which serves as a fixed projection 60. The length of the sleeve is such that when the projection 60 bears against the outside face of a packing sleeve 61 an opposite end 62 extends a substantial distance outwardly from the packing ring 40 and slightly beyond the packing sleeve 35.

A single pair of holes 63, 64 are formed in the packing sleeve 35 to accommodate the cotter pin 53. In the axle 51 is a single diametrically extending cotter pin hole 65. The bearing sleeve 62, however is prepared with a number of pairs of diametrically opposite holes, one pair 66, 67 being shown in position receiving the cotter pin 63. Three more pairs are shown, one being identified by the holes 68, 69, another by the holes 70, 71, and still another by the holes 72, 73. As indicated to particular advantage in Figure 7 the pair of holes of which the hole 68 is visible is offset toward the right from the pair of holes 66, 67 by a slight distance. This distance in reality would be a few thousandths of an inch. Also the pair of holes indicated in Figure 7 by the visible hole 70 is offset a corresponding fractional distance as is also the pair of holes indicated by the hole 72.

In the usual course of assembly the wheel bearings, packing elements and bearing sleeve are assembled with the bearing sleeve extending through the wheel cavity and with the cotter pin 53 inserted through the pair of holes which makes the snuggest adjustment of the roller bearings. The hub cavity will be packed with grease at this point. When the wheel assembly is to be placed upon a truck and in service, the bearing races can be adjusted to a freely rotating position. This is accomplished by the mechanic on the job without the necessity for drilling any holes nor for making any fine adjustment other than to permit the packing sleeve 35 to move away from the inner race of the adjacent roller bearing a distance indicated by the offset relationship between the pair of holes 66, 67 and the pair of holes 68, 69. The cotter pin 53 can then be inserted through the holes 68, 69 if that be the preferred adjustment. If this be insufficient to provide a satisfactorily freely rotating bearing adjustment then the packing sleeve 35 can be moved out a slight distance further and the cotter pin inserted through the pair of holes 70, 71 of the bearing sleeve. The nicety of bearing adjustment is such that within the range of the four pairs of holes a satisfactory adjustment can be found. This, as will be noted, can be achieved without the necessity of disassembling the device and consequent retention of the packed relationship of all the parts when the assembly is initially made.

There has accordingly been described a sealed wheel structure which is simple in its design and which effectively seals the interior of the hub and all working parts thereof against the damaging effect of gases and liquids by the interposition of seals at all joints, the seals being at the outermost portion of those joints.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A sealed wheel mechanism comprising a tire, a hub, and a spoke flange connecting said tire and said hub, means forming an axial cavity extending through the hub and a rim at at least one end of the cavity, fastening means on the hub at the end of the cavity adjacent the rim, and means forming a packing recess in the exterior surface of said rim, and axle means extending through the cavity, bearing rings mounting the hub on the axle means, a packing sleeve around the axle means at the end of the cavity adjacent said rim, means forming an annular recess on the inner face of the sleeve at the outside end thereof and a resilient seal in said last recess in engagement with the exterior of the axle, and a rigid packing ring having fastening means complementary to and in engagement with said first identified fastening means, an outer annular portion of said rigid packing ring overlying said packing recess and a resilient seal in said packing recess underlying said annular portion, means forming an annular pocket in said packing ring facing the sleeve and a radially extensible packing gland having one side thereof confined in said pocket and the other side thereof extending into sealing engagement with the exterior surface of the sleeve.

2. A sealed wheel mechanism comprising a tire, a hub, and a spoke flange connecting said tire and said hub, means forming an axial cavity extending through the hub and a rim at each end of the cavity, fastening means on the hub at each end of the cavity adjacent the rim and means forming a packing recess in the exterior surface of each said rim opposite said fastening means, an axle extending through the cavity, bearing rings mounting the hub on the axle, a packing sleeve around the axle at each end of the cavity adjacent the rim, means forming an annular recess on the inner face of each sleeve adjacent the outermost end and a resilient seal in each said last recess in engagement with the exterior of the axle, and a rigid packing ring having fastening means complementary to and in engagement with each said first fastening means, an annular portion of each ring extending radially outwardly relative to the fastening means and overlying said packing recess, and a resilient seal in each packing recess underlying said portion, means forming an annular pocket in each packing ring facing the sleeve and a radially extensible packing gland having one side thereof confined in said pocket and the other side thereof extending into sealing engagement with the exterior surface of the respective sleeve.

3. A sealed wheel mechanism comprising a tire, a hub, and a spoke flange connecting said tire and said hub, means forming an axial cavity extending through the hub and a rim at each end of the cavity, female threads at each end of the cavity adjacent the rim and means forming an undercut recess on the outside of each said rim opposite said threads, an axle extending through the cavity, bearing rings mounting the hub on the axle, a packing sleeve around the axle at each end of the cavity and in engagement with the outer face of the respective bearing ring, means forming an annular recess on the inner face at the outside end of each sleeve and an O ring seal in each said last recess in engagement with the exterior of the axle, and an exteriorly threaded packing ring in engagement with each female thread, a flange on each packing ring overlying said undercut recess and an O ring seal confined in each undercut recess by said flange, means forming an annular pocket having opposite circumferential flange elements in each packing ring facing the respective sleeve and a V shaped packing gland having one leg thereof confined in said pocket by said flange elements and the other leg thereof extending obliquely into sealing engagement at the outer end with the exterior surface of the respective sleeve.

4. A sealed wheel mechanism comprising a tire, a hub, and a spoke flange connecting said tire and said hub, means forming an axial cavity extending through the hub and a rim at each end of the cavity, female threads at each end of the cavity adjacent the rim and means forming an undercut recess on the outside of each said rim opposite said threads, an axle extending through the cavity, a bearing sleeve surrounding the axle throughout the length of said cavity, bearing rings mounting the hub on the bearing sleeve, a packing sleeve around the bearing sleeve at each end of the cavity and in engagement with the outer face of the respective bearing ring, and a pin extending through the packing sleeve, the bearing sleeve and said axle to secure all said sleeves to the axle, means forming an annular recess on the inner face at the outside end of each packing sleeve and an O ring seal in each said last recess in engagement with the exterior of the bearing sleeve, and an exteriorly threaded packing ring in engagement with each female thread, a flange on each ring overlying said undercut recess and an O ring seal confined in each undercut recess by said flange means forming an annular pocket having opposite circumferential flange elements in each ring facing the respective packing sleeve and a V-shaped packing gland having one leg thereof confined in said pocket by said flange elements and the other leg thereof extending obliquely into sealing engagement at the outer end with the exterior surface of the respective packing sleeve.

5. A sealed wheel mechanism comprising a rim, a hub, a spoke flange connecting said rim and said hub, means forming an axial cavity extending through said hub, a bearing sleeve having a fixed projection at one end and extending centerably through said cavity, a pair of roller bearings having inner races on said bearing sleeve and outer races on said hub, a packing sleeve around the bearing sleeve at each end of the cavity adjacent the rim, means forming an annular recess on the inner face of each packing sleeve and a resilient seal in each said last recess in engagement with the exterior of the bearing sleeve, one of said packing sleeves having a fixed position between said projection and the inner race of the adjacent bearing, the other packing sleeve having a position against the inner race of the other bearing and extending outwardly of the respective end of the cavity, said axle and said packing sleeve having aligned cotter pin holes, said bearing sleeve having a plurality of pairs of circumferentially spaced cotter pin holes progressively offset axially with respect to each other whereby to provide different positions of adjustment of the packing sleeves on said bearing sleeve relative to said inner bearing races.

6. A sealed wheel mechanism comprising a rim, a hub, a spoke flange connecting said rim and said hub, means forming an axial cavity extending through said hub, a bearing sleeve having a fixed projection at one end and extending centerably through said cavity, a pair of roller bearings having inner races on said bearing sleeve and outer races on said hub, a packing sleeve around the bearing sleeve at each end of the cavity adjacent the rim, means forming an annular recess on the inner face of each packing sleeve and a resilient seal in each said last recess in engagement with the exterior of the bearing sleeve, one of said packing sleeves having a fixed position between said projection and the inner race of the adjacent bearing, the other pocking sleeve having a position against the inner race of the other bearing and extending outwardly of the respective end of the cavity, said axle and said packing sleeve having aligned cotter pin holes, said bearing sleeve having a plurality of pairs of circumferentially spaced cotter pin holes progressively offset axially with respect to each other whereby to provide different positions of adjustment of the packing sleeves on said bearing sleeve relative to said inner bearing races, and a packing ring at each end of the cavity, each ring having a threaded engagement with the interior of said respective rim, a packing recess on the exterior of each rim, a portion of each ring overlying said packing recess and a resilient seal confined in said recess, means forming an annular pocket in each packing ring adjacent the packing sleeve, and a radially extensible annular packing gland having one side thereof confined in said pocket and the other side thereof extending into rotating sealing engagement with the exterior surfaces of the respective packing sleeve.

References Cited in the file of this patent

UNITED STATES PATENTS

| 2,512,148 | Gaines | June 20, 1950 |
| 2,617,698 | Gaines | Nov. 11, 1952 |

FOREIGN PATENTS

| 510,664 | Germany | Oct. 22, 1930 |

OTHER REFERENCES

Product Engineering, November 1948, pages 122–123.